United States Patent [19]

Chang et al.

[11] Patent Number: 4,604,443

[45] Date of Patent: Aug. 5, 1986

[54] PARTIAL HYDROLYZATES CONTAINING HYDROLYZABLE MOIETIES FROM ORGANOSILANE COMPOUNDS

[75] Inventors: Wen-Hsuan Chang, Gibsonia; Edward L. Dufford, Sarver, both of Pa.

[73] Assignee: PPG Industries, Inc., Pittsburgh, Pa.

[21] Appl. No.: 728,968

[22] Filed: Apr. 30, 1985

[51] Int. Cl.$^4$ ............................................. C08G 77/04
[52] U.S. Cl. ....................................... 528/28; 525/61; 525/403; 525/431; 525/446; 528/10; 528/18; 528/38; 528/29; 528/43; 528/26; 528/27
[58] Field of Search ........................ 528/28, 29, 26, 27, 528/18, 10, 38, 43; 525/446, 403, 431, 61

[56] References Cited

U.S. PATENT DOCUMENTS

| | | | |
|---|---|---|---|
| 3,451,838 | 6/1969 | Burzynski et al. | 117/33.3 |
| 3,460,980 | 8/1969 | Burzynski | 117/132 |
| 3,634,321 | 1/1972 | Nugent et al. | 260/46.5 |
| 3,642,693 | 2/1972 | Jasinski | 260/46.5 |
| 3,792,071 | 2/1974 | Nitzsche et al. | 260/448.8 |
| 4,191,713 | 4/1980 | Yonezawa et al. | 525/102 |
| 4,242,252 | 12/1980 | Newing | 260/33.4 |
| 4,243,767 | 1/1981 | Kaufman et al. | 525/102 |
| 4,368,294 | 1/1983 | Deubzer et al. | 525/100 |
| 4,378,250 | 4/1983 | Treadway et al. | 106/287.11 |
| 4,399,261 | 8/1983 | Kato et al. | 525/342 |
| 4,444,973 | 4/1984 | Schonfelder et al. | 528/28 |
| 4,446,292 | 5/1984 | Chang et al. | 528/29 |
| 4,467,081 | 8/1984 | Chang et al. | 528/26 |
| 4,472,465 | 9/1984 | Burrill | 427/387 |
| 4,501,872 | 2/1985 | Chang et al. | 528/18 |

FOREIGN PATENT DOCUMENTS 126470 7/1984 Japan.
2063281A 6/1981 United Kingdom.

Primary Examiner—Melvyn I. Marquis
Attorney, Agent, or Firm—Thomas M. Breininger

[57] ABSTRACT

Disclosed is an ungelled partial hydrolysis product of an organosilicon-containing material, a method for preparing the partial hydrolysis product, and a composition such as a coating composition containing the partial hydrolysis product. The organosilicon-containing material for preparation of the ungelled partial hydrolysis product has an average functionality based on easily hydrolyzable Y groups attached to silicon atoms of greater than or equal to 2.4. The organosilicon-containing material for preparation of the ungelled partial hydrolysis product contains greater than or equal to 10 mole percent of at least one organosilane compound corresponding to the formula, R—Si—Y$_3$. In the aforesaid formula, R represents hydrogen or a $C_1$–$C_{10}$ group joined to Si through an Si—C linkage. Each Y in the aforesaid formula represents an easily hydrolyzable group. The partial hydrolysis product is prepared by hydrolyzing a portion of the easily hydrolyzable groups of the organosilane compound with a controlled amount of water. The amount of water employed in the controlled hydrolysis is determined according to the following formula, $$(E_{1,2} \times 0.5) + (E_{3,4} \times Z) = W,$$

wherein

W represents the total moles H$_2$O employed calculated based on the total equivalents of the easily hydrolyzable groups employed, $E_{1,2}$ represents the total number of equivalents of Y employed from organosilane compounds containing one or two Y groups, $E_{3,4}$ represents the total number of equivalents of Y employed from organosilane compounds containing three or four Y groups, and Z is a number in the range of from 0.023 to 0.43.

25 Claims, No Drawings

4,604,443

PARTIAL HYDROLYZATES CONTAINING HYDROLYZABLE MOIETIES FROM ORGANOSILANE COMPOUNDS

BACKGROUND OF THE INVENTION

Field of the Invention

This invention is directed to an ungelled partial hydrolysis product of an organosilicon-containing material prepared utilizing an amount as specified of at least one organosilane corresponding to a specified formula (I) infra and a relatively small, controlled amount of water. The invention is also directed to a composition, especially a coating composition, prepared utilizing the partial hydrolysis product, which composition cures at low temperature, preferably ambient temperature, in the presence of moisture.

Some Objects of the Present Invention

There is a continuing need, particularly in the coatings industry, to provide compositions which have low curing temperatures and, preferably, which cure at ambient temperature. There is also a continuing need to provide compositions which contain ever lower concentrations of volatile organic components under the conditions of curing. Additionally, it would be desirable to provide compositions which do not depend on organic isocyanates for curing.

However, previous approaches to meet these challenges generally have involved disadvantageous compromises among desirable coating composition properties such as molecular weight of the principal film forming resin, application viscosity of the composition, low curing temperature, and desirable properties of the cured film such as water resistance, flexibility, hardness, solvent resistance, etc.

Objects of the present invention are to help meet these challenges. Additionally, an object of the present invention is to prepare new curing agents for organic polyols. Other objects of the invention will become apparent to the reader infra.

SUMMARY OF THE INVENTION

The present invention is for an ungelled partial hydrolysis product of an organosilicon-containing material and to compositions, for example coating compositions, containing the partial hydrolysis product. The organosilicon-containing material for preparation of the ungelled partial hydrolysis product has an average functionality based on easily hydrolyzable Y groups attached to silicon atoms of greater than or equal to 2.4. The organosilicon-containing material for preparation of the ungelled partial hydrolysis product contains greater than or equal to 10 mole percent of at least one organosilane compound corresponding to the formula (I) R—Si—Y$_3$, and typically contains greater than or equal to 30 mole percent of the organosilane compound corresponding to the formula R—Si—Y$_3$. In the aforesaid formula, R represents hydrogen or a C$_1$–C$_{10}$ group joined to Si through an Si—C linkage. Each Y, which may be the same or different, in the aforesaid formula independently represents an easily hydrolyzable group. The partial hydrolysis product is prepared by hydrolyzing a portion of the easily hydrolyzable groups of the organosilane compound with a controlled amount of water. The amount of water employed in the controlled hydrolysis is determined according to the following formula (II), $(E_{1,2} \times 0.5) + (E_{3,4} \times Z) = W$, wherein W represents the total moles of H$_2$O employed calculated based on the total equivalents of said easily hydrolyzable groups employed, E$_{1,2}$ represents the total number of equivalents of Y employed from organosilane compounds containing one or two Y groups, E$_{3,4}$ represents the total number of equivalents of Y employed from organosilane compounds containing three or four Y groups, and Z is a number in the range of from 0.023 to 0.43.

A coating composition of the invention is nonaqueous i.e., is substantially free of water.

DETAILED DESCRIPTION OF THE INVENTION

A partial hydrolysis product of the invention is ungelled. As used herein "ungelled" means that the partial hydrolysis product is fluid per se or can be made fluid with organic solvent. The partial hydrolysis product is prepared by the hydrolysis of an organosilicon-containing material employing a controlled amount of water. The organosilicon-containing material for preparation of the ungelled partial hydrolysis product contains at least one organosilane compound corresponding to the formula R—Si—Y$_3$, (I), and contains greater than or equal to 10 mole percent, preferably greater than or equal to 30 mole percent, and more preferably greater than or equal to 60 mole percent, of the organosilane compound corresponding to the formula R—Si—Y$_3$ based on the total moles of organosilane compounds containing easily hydrolyzable groups in the organosilicon-containing material. The organosilicon-containing material for preparation of the ungelled partial hydrolysis product has an average functionality based on easily hydrolyzable Y groups attached to silicon atoms of the organosilane compounds present (but excluding organosilane compounds which may be present having only 1 easily hydrolyzable group Y) of equal to or greater than 2.4, preferably equal to or greater than 2.6, and most preferably equal to or greater than 2.8. It is desirable to have a high degree of hydrolyzable Y group functionality in an ungelled partial hydrolysis product of the invention to enhance the reactivity of the ungelled partial hydrolysis product with coreactive materials such as, for example, hydroxyl-functional (i.e., C—OH) materials such as organic polyols. Additionally, it is desirable that the amount of phenyl groups attached to silicon atoms in ungelled partial hydrolysis products of the invention be minimized since the presence of such groups tends to decrease the reactivity of ungelled partial hydrolysis products of the invention with coreactive materials such as the aforesaid organic polyols.

In the aforesaid formula (I), R represents hydrogen or a C$_1$–C$_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group and/or a halo group. In the aforesaid definition of R, it is to be understood that the C$_1$–C$_{10}$ group joined to Si through an Si—C linkage can be saturated or can contain aromatic and/or ethylenic unsaturation;

however it is preferred that R be an aliphatic group. It is also preferred that R be selected from hydrogen or a $C_1$-$C_5$ group, more preferably from hydrogen or a $C_1$-$C_3$ group, and most preferably from a methyl group.

Each Y, which may be the same or different in the aforesaid formula (I), represents an easily hydrolyzable group. The partial hydrolysis product is prepared by hydrolyzing a portion of the easily hydrolyzable groups of the organosilane compound(s) with a controlled amount of water. The amount of water employed in the controlled hydrolysis is determined according to the following formula (II), $(E_{1,2} \times 0.5) + (E_{3,4} \times Z) = W$, wherein W represents the total moles of $H_2O$ employed calculated based on the total equivalents of the easily hydrolyzable groups employed, $E_{1,2}$ represents the total number of equivalents of Y employed from organosilane compounds containing one or two Y groups, $E_{3,4}$ represents the total number of equivalents of Y employed from organosilane compounds containing three or four Y groups, and Z is a number in the range of from 0.023 to 0.43, preferably in the range of from 0.050 to 0.33, and more preferably in the range of from 0.080 to 0.23.

It is to be understood that one equivalent of the easily hydrolyzable groups corresponds to one mole of the easily hydrolyzable groups, and one equivalent of water corresponds to ½ mole of water.

Examples of groups which can represent the hydrolyzable group Y include —$OR^1$,

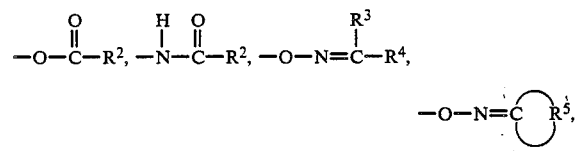

and the monohydroxy and/or cyclic $C_2$-$C_3$ residue of a 1,2- or 1,3-glycol, wherein $R^1$ represents $C_1$-$C_3$ alkyl, preferably $C_1$-$C_2$ alkyl, and more preferably methyl, $R^2$ independently represents H or $C_1$-$C_4$ alkyl, $R^3$ and $R^4$ independently represent H, $C_1$-$C_4$ alkyl, $C_6$-$C_8$ aryl and $R^5$ represents $C_4$-$C_7$ alkylene. Methoxy, ethoxy and acetoxy are particularly preferred hydrolyzable groups, Y.

Of the above examples of hydrolyzable groups Y, the groups

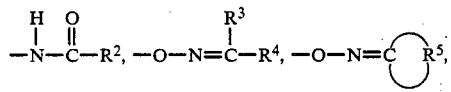

and the monohydroxy and/or cyclic $C_2$-$C_3$ residue of a 1,2- or 1,3-glycol as defined above, are less preferred than the hydrolyzable group —$OR^1$ as defined above, the groups

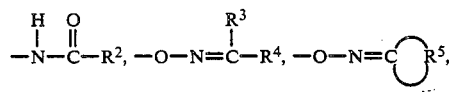

being much less preferred since they can contribute to higher weight loss than desired for some applications when partial hydrolysis products of the invention containing these groups, or compositions utilizing partial hydrolysis products of the invention containing these groups, are cured; and their products upon cure tend to have lower vapor pressures than desired for some applications which may increase the curing times and/or temperatures of partial hydrolysis products of the invention containing these groups, or compositions utilizing partial hydrolysis products of the invention containing these groups. Thus, these groups are less preferable than the aforesaid —$OR^1$ groups, particularly methoxy and ethoxy, where short curing times, low weight loss and low curing temperatures are an important consideration.

Examples of organosilances corresponding to the formula (I), R—Si—$Y_3$, which may be employed for preparation of ungelled partial hydrolysis products of the invention include: methyl trimethoxy silane, methyl triethoxy silane, amyl triethoxy silane, triethoxy silane, methyl triacetoxy silane, phenyl trimethoxy silane, vinyl trimethoxy silane, vinyl triethoxy silane, allyl trimethoxy silane, allyl triethoxy silane, gamma-aminopropyl trimethoxy silane, gamma-aminopropyl triethoxy silane, beta-aminoethyl trimethoxy silane, beta-aminoethyl triethoxy silane, N-beta-aminoethylaminopropyl trimethoxy silane, gamma-isocyanatopropyl triethoxy silane, mercaptopropyl trimethoxy silane, mercaptoethyl trimethoxy silane, mercaptopropyl triethoxy silane, glycidoxypropyl trimethoxy silane, glycidoxypropyl triethoxy silane, 4,5-epoxycyclohexylethyl trimethoxy silane, ureidopropyl trimethoxy silane, ureidopropyl triethoxy silane, chloropropyl trimethoxy silane, chloropropyl triethoxy silane,

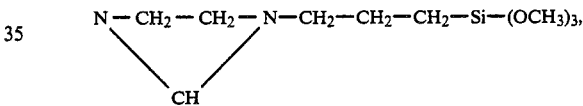

cyanopropyl trimethoxy silane, and the like. Of the aforesaid examples of organosilanes corresponding to the formula (I), particularly preferred are methyl trimethoxy silane, methyl triethoxy silane, and methyl triacetoxy silane. Of course, it will be understood that mixtures of organosilanes corresponding to the formula (I) can be employed to prepare the ungelled partial hydrolysis products of the invention.

Additionally, organosilanes other than the organosilanes corresponding to formula (I) can be used along with those corresponding to formula (I) in the organosilicon-containing material for preparation of an ungelled partial hydrolysis product of the invention. For example, in one preferred embodiment, the organosilicon-containing material for preparation of the ungelled partial hydrolysis product contains from 0.1 to 0.8 moles of methyl trimethoxy silane, from 0.1 to 0.8 moles of methyl phenyl dimethoxy silane and from 0.1 to 0.8 moles of phenyl trimethoxy silane; preferably from 0.2 to 0.8 moles of methyl trimethoxy silane, from 0.2 to 0.8 moles of methyl phenyl dimethoxy silane and from 0.2 to 0.8 moles of phenyl trimethoxy silane; more preferably from 0.4 to 0.8 moles of methyl trimethoxy silane, from 0.4 to 0.8 moles of methyl phenyl dimethoxy silane and from 0.4 to 0.8 moles of phenyl trimethoxy silane. However, when such a mixture of organosilanes is employed, the organosilicon-containing material contains greater than or equal to 10 mole percent, preferably greater than or equal to 30 mole percent, more preferably greater than or equal to 60 mole percent, of at least one organosilane compound corresponding to formula (I), namely R—Si—Y$_3$. It has been found that often such partial hydrolysis products of methyl trimethoxy silane, methyl phenyl dimethoxy silane, and phenyl trimethoxy silane are more compatible with organic polymers such as, for example, hydroxyl-functional acrylic resins than the partial hydrolysis product of methyl trimethoxy silane alone.

Classes of such organosilanes not necessarily corresponding to formula (I) which can be used, along with a compound corresponding to formula (I) above, in the organosilicon-containing materials for preparation of the ungelled partial hydrolysis products of the invention include, but are not limited to, the following classes (1) through (4).

(1) Suitable organosilicon-containing materials include optional organosilicates such as organosilicates corresponding to the following formula, (IV),

wherein

R$^6$ represents methyl, ethyl or propyl (thus OR$^6$ is a "lower alkoxy moiety"), R$^7$ represents alkyl containing at least 4 carbon atoms, aryl, alkylaryl, arylalkyl, aryloxyalkyl, or alkyloxyalkyl, and x is an integer ranging from 0 to 2, preferably 0 or 1, and more preferably 0.

Examples of useful organosilicates include: tetramethoxy silane, tetraethoxy silane, tetra-n-propoxy silane, methoxy triethoxy silane, dimethoxy diethoxy silane, trimethoxy-n-propoxy silane, bis(2-ethylhexoxy) diethoxy silane and the like. Mixtures of organosilicates also may be employed.

Of the organosilicates corresponding to the formula (IV), above, the tetraalkoxy silanes wherein x equals 0 in formula (IV) are preferred. The tetraalkoxy silanes provide a high degree of functionality to the partial hydrolysis products of the invention and enhance the ease with which the compositions of the invention can be cured. Additionally, the tetraalkoxy silanes are readily available at low cost. Furthermore, they can be used to attach modifying groups such as those represented by —OR$^7$ in formula (IV) above, an example of which is a sec-butoxy group; and such modification is preferred in many uses. Of the examples of organosilicates described above, tetramethoxy silane is desirable for some purposes because of the ease with which it reacts. Tetraethoxy silane is also desirable since, although tetraethoxy silane is not as reactive as tetramethoxy silane, it is not as highly volatile as tetramethoxy silane.

Examples of organosilicates, other than the above organosilicates, which may be utilized in preparing the ungelled partial hydrolysis product include tetraacetoxy silane, diethoxy diacetoxy silane, and

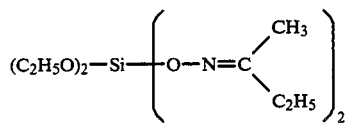

Hydrolyzed organosilicates can provide increased reactive groups per molecule in the ungelled partial hydrolysis products of the invention. Additionally, the hydrolyzed organosilicates can help provide low volatility to the ungelled partial hydrolysis products of the invention. Also they can help to provide compatibility with many organic materials.

In preparing a partial hydrolysis product, for example, when optional organosilicate of formula (IV) above is employed along with organosilane compound corresponding to R—Si—Y$_3$ as defined above, a controlled amount of water is employed. Typically the hydrolysis product will be prepared utilizing a ratio of moles of the organosilicate to moles of water ranging from 1:0.75 to 1:0.4. The amount of unhydrolyzed organosilicate compound in the partial hydrolysis product typically is less than 50 percent by weight of the organosilicate compound based on the total weight of starting organosilicate compound.

Where desired, organosilicates containing higher alkoxy, aryloxy, arylalkyloxy, alkylaryloxy, alkyloxyalkyloxy, and/or aryloxyalkyloxy moieties attached to silicon atoms in addition to the hydrolyzable moieties may be employed for preparation of the ungelled partial hydrolysis products of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides enhances hydrolytic stability to ungelled partial hydrolysis products of the invention and enhanced hydrolytic stability to cured films prepared from compositions based on ungelled partial hydrolysis products of the invention. Also, such moieties can be employed to control the degree of crosslinking in films prepared from compositions utilizing partial hydrolysis products of the invention.

(2) Suitable organosilicon-containing materials include nonfunctional organosilanes. As used herein, a nonfunctional organosilane is understood to mean a material corresponding to the formula, (VI),

wherein

R$^8$ represents hydrogen, alkyl, aryl, alkylaryl, arylalkyl, or aryloxyalkyl, preferably C$_1$–C$_3$ alkyl, and most preferably methyl;

Y represents —OR$^1$,

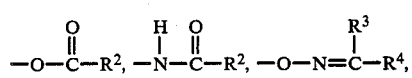

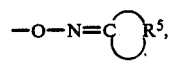

and the monohydroxy and/or cyclic C$_2$–C$_3$ residue of a 1,2- or 1,3-glycol, wherein $R^1$ represents $C_1$-$C_3$ alkyl, preferably $C_1$-$C_2$ alkyl, and more preferably methyl, $R^2$ independently represents H or $C_1$-$C_4$ alkyl, $R^3$ and $R^4$ independently represent H, $C_1$-$C_4$ alkyl, $C_6$-$C_8$ aryl and $R^5$ represents $C_4$-$C_7$ alkylene, and m is an integer ranging from 1 to 2, preferably 1.

It should be understood that the term "nonfunctional organosilane" wherever appearing herein is used for convenience to distinguish compounds corresponding to the above formula, (VI) from those compounds referred to herein for convenience as functional organosilanes and corresponding to the formula (VII) infra. Thus, although moieties defined by Y in formula (VI) are easily displaceable by reaction with water and/or alcohol and are, therefore, necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water is employed. Typically the hydrolysis product will be prepared utilizing a ratio of moles of the nonfunctional organosilane to moles of water ranging from 1:0.75 to 1:0.4. The amount of unhydrolyzed nonfunctional organosilane in the partial hydrolysis product typically is less than 50 percent by weight of the nonfunctional organosilane compound based on the total weight of starting nonfunctional organosilane compound.

Typically, when a nonfunctional organosilane is utilized as organosilicon-containing material, a nonfunctional organosilane corresponding to formula (VI) in which Y corresponds to $-OR^1$ as defined above is employed.

Examples of nonfunctional organosilanes corresponding to the above formula, (VI), include methyl trimethoxy silane (e.g., available from Union Carbide Corp. as A-163), dimethyl dimethoxy silane, methyl triethoxy silane, dimethyl diethoxy silane, dimethoxy diphenyl silane, dimethoxy methyl phenyl silane, diethoxy dipropyl silane, dimethoxy dipropyl silane, and the like. Additional examples of the nonfunctional organosilanes include amyl triethoxy silane and triethoxy silane. Compounds such as trimethyl methoxy silane, trimethyl ethoxy silane, and ethoxy tripropyl silane may be employed if desired in limited, controlled amounts for modification purposes.

The nonfunctional organosilanes contribute to water resistance, toughness, and stain resistance of cured films prepared from compositions of the invention based on ungelled partial hydrolysis products which incorporate these nonfunctional organosilanes. Trialkoxysilanes corresponding to formula (VI) above (i.e., m equals 1 and Y represents $-OR^1$) are preferred, those in which $R_8$ represents hydrogen, methyl, ethyl, or phenyl and $-OR^1$ represents methoxy or ethoxy being more preferred, and those in which $R_8$ represents methyl and $-OR^1$ represents methoxy being most preferred. Moreover, the dimethyl dialkoxy silanes corresponding to formula (VI) above are less desirable than the trialkoxy silanes since it is believed that the dimethyl dialkoxy silanes tend to decrease the adhesion to the substrate of cured films prepared from compositions of the invention incorporating the dimethyl dialkoxy silanes.

As stated above, trialkoxy silanes corresponding to formula (VI) such as methyl trimethoxy silane are especially preferred as organosilicon-containing material. Phenyl trialkoxy silane or trialkoxy silanes wherein $-R^8$ in formula (VI) is represented by an aliphatic group containing more than about 10 carbon atoms are less desirable than methyl trimethoxy silane since they tend to decrease the ease of curing of ungelled partial hydrolysis products of the invention and compositions of the invention containing such hydrolysis products. However, phenyl trialkoxy silanes often help the weatherability of films when properly cured, for example at temperatures above about 250 degrees F. (121° C.) in the presence of a catalyst.

Where desired, a nonfunctional organosilane containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for exsmple, by reacting a nonfunctional organosilane such as methyl trimethoxy silane with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxy dimethoxy methyl silane, isopentoxy dimethoxy methyl silane, 2-ethylhexoxy dimethoxy methyl silane, tolyloxy dimethoxy methyl silane, phenylethyloxy dimethoxy methyl silane, and the like.

(3) Suitable organosilicon-containing materials include functional organosilanes. As used herein, a "functional organosilane" is intended to include materials corresponding to the following formula, VII, $$F-G-SiY_3 \qquad (VII),$$

wherein

G represents an organo group containing from 2 to 10 carbon atoms,

Y represent $-OR^1$,

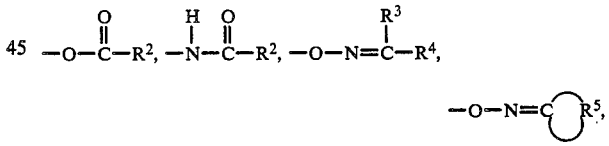

and the monohydroxy and/or cyclic $C_2$-$C_3$ residue of a 1,2- or 1,3-glycol, wherein $R^1$ represents $C_1$-$C_3$ alkyl, preferably $C_1$-$C_2$ alkyl, and more preferably methyl, $R^2$ independently represents H or $C_1$-$C_4$ alkyl, $R^3$ and $R^4$ independently represent H, $C_1$-$C_4$ alkyl, $C_6$-$C_8$ aryl and $R^5$ represents $C_4$-$C_7$ alkylene, and F represents amino, polyamino, 1,2-epoxy, mercapto, halo, cyano, isocyanato, ureido, imidazolinyl, acrylato, methacrylato, or a group corresponding to $-SiY_3$, wherein Y is as defined above.

In accordance with the discussion of the distinction between nonfunctional organosilanes and functional organosilanes as these terms are used herein, groups defines by F above are considered to be the "functional" groups encompassed by the term "functional organosilane." It also should be understood that compounds such as vinyl trimethoxy silane, vinyl triethoxy silane, allyl trimethoxy silane and allyl triethoxy silane, which contain functional groups such as allyl and vinyl, while not literally corresponding to formula (VII) above, are considered herein to fall within the meaning of functional organosilanes. Some examples of functional organosilanes include gamma-aminopropyl trimethoxy silane, gamma-aminopropyl triethoxy silane, beta-aminoethyl trimethoxy silane, beta-aminoethyl triethoxy silane, N-beta-aminoethylaminopropyl trimethoxy silane, gamma-isocyanatopropyl triethoxy silane, vinyl trimethoxy silane, vinyl triethoxy silane, allyl trimethoxy silane, allyl triethoxy silane, mercaptopropyl trimethoxy silane, mercaptoethyl trimethoxy silane, mercaptopropyl triethoxy silane, glycidoxypropyl trimethoxy silane, glycidoxypropyl triethoxy silane, 4,5-epoxycyclohexylethyl trimethoxy silane, ureidopropyl trimethoxy silane, ureidopropyl triethoxy silane, chloropropyl trimethoxy silane, chloropropyl triethoxy silane, cyanopropyl trimethoxy silane, and

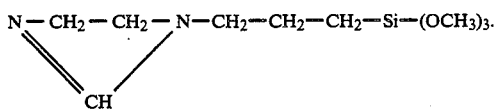

It will be appreciated that functional organosilanes containing mutually reactive functional groups such as 1,2-epoxy and amino, or amino and isocyanato, etc., or groups defined by F above which are reactive with groups defined by Y above, should be employed in controlled amounts to prepare the ungelled partial hydrolysis products of the invention so as to avoid gelation or products of undesirably high viscosity.

Although the incorporation of the functional organosilanes in the organosilicon-containing material may be desirable for some purposes, functional organosilanes tend to be costly. It has been found that cured compositions of the invention having excellent properties can be made from ungelled partial hydrolysis products of the invention from organosilicon-containing material in which the amount of such functional organosilanes is minimized or even eliminated. However, functional organosilanes often can help with the compatibility with other organic materials, with adhesion to substrates, and can be utilized for curing through the functional group F with coreactive groups. Moreover, for some purposes, ungelled partial hydrolysis products prepared from organosilicon-containing material containing a mixture of nonfunctional organosilane and amino-containing functional organosilane are desirable.

(4) It is to be understood that mixtures of (1) the optional organosilicates, and/or (2) the nonfunctional organosilanes, and/or (3) the functional organosilanes may be employed in the organosilicon-containing material containing greater than or equal to 10 mole percent of at least one organosilane compound corresponding to the formula (I) above, namely R—Si—Y$_3$, for preparation of ungelled partial hydrolysis products of the invention.

As indicated previously herein, the ungelled partial hydrolysis product is prepared by hydrolyzing easily hydrolyzable groups of the organosilane compound(s) with a controlled amount of water wherein the amount of water employed in the controlled hydrolysis is determined according to the above formula (II). For example, just one useful mixture of organosilanes, suitable as the organosilicon-containing material for preparation of an ungelled partial hydrolysis product of the invention, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane and 0.234 equivalents of methoxy groups from the methyl phenyl dimethoxy silane. Thus is formula (II) above, $E_{1,2}$ would equal 0.234 and $E_{3,4}$ would equal 4.05; and assuming the maximum amount of water allowed by the formula (i.e., Z=0.43), the total moles of water for preparation of the partial hydrolysis product would equal 1.86 moles. Or in other words, a maximum of 1.27 moles of water per mole of organosilane compound (i.e., 1.86 moles/1.468 moles equals 1.27).

In preparing an ungelled, partial hydrolysis product of the invention a controlled amount of water according to formula (II) above is utilized. Generally, the ungelled partial hydrolysis product will contain condensation product compounds having one or more siloxane linkages represented by the formula, (V),

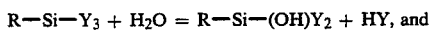

(V)

The hydrolysis and condensation reactions believed to be involved in the preparation of the ungelled partial hydrolysis products typically may be illustrated as follows:

[hydrolysis]

R—Si—Y$_3$ + H$_2$O = R—Si—(OH)Y$_2$ + HY, and

[condensation]

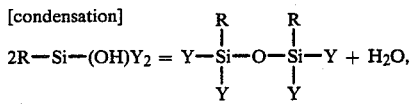

wherein R and Y represent groups as defined in formula (I) above. The amount of organosilane compound (i.e., R—Si—Y$_3$) remaining after hydrolysis and condensation in an ungelled partial hydrolysis product of the invention typically is less than 50 percent by weight based on the total weight of starting organosilane compound. Of course, it will be understood that the relative amounts of constituents in a partial hydrolysis product of the invention can be adjusted, for example by distilling off a portion, as desired, of volatile constituents from the partial hydrolysis product.

It will be appreciated from the disclosure herein, that the ungelled partial hydrolysis products of the invention, considering that they are prepared utilizing such a small, controlled amount of water, will contain a mixture of low molecular weight compounds which contain residual hydrolyzable Y groups. The ungelled partial hydrolysis products typically will contain greater than 5.0, and usually greater than 8.0, milliequivalents of residual hydrolyzable Y groups per gram of ungelled partial hydrolysis product. There is also the possibility that the ungelled partially hydrolysis products also contain a small amount of silanol-type (≡Si—OH) hydroxyl groups; however, the ungelled partial hydrolysis products generally will contain a ratio of residual hydrolyzable Y groups to silanol-type hydroxyl groups greater than 1.00, and typically greater than 3.00. Too high a level of silanol-type hydroxyl groups in hydrolyzed organosilane products tends to render the hydrolysis products incompatible with organic solvents to a disadvantageous degree, thereby significantly limiting their utility for organic solvent-borne compositions such as, for example, essentially nonaqueous, organic solvent-borne coating compositions.

The partial hydrolysis of the organosilicon-containing material containing greater than or equal to 10 mole percent of at least one organosilane compound corresponding to the formula (I), namely R—Si—Y$_3$, typically is conducted in the presence of from 0.01 to 20 percent by weight of a catalyst, which in some instances also can function as a coreactant, examples of which catalyst include gamma-aminopropyl triethoxy silane, isophorone diamine, 2-amino-2-methyl-1-propanol, or the like. The percent by weight of catalyst is based on the total weight of the organosilicon-containing material. Sometimes a solvent such as methanol or ethanol is desired to render the organosilicon containing material compatible with water in order to obtain a more desirable product.

An ungelled partial hydrolysis product of the invention typically contains an amount of hydrolyzable Y groups such that the ratio of the number of grams of the ungelled partial hydrolysis product to equivalents of the hydrolyzable Y groups in the ungelled partial hydrolysis product is in a range of from 40 to 300, usually in a range of from 50 to 200. In other words, the "hydrolyzable group equivalent weight" of an ungelled hydrolysis product of the invention typically is in a range of from 40 to 300, usually in a range of from 50 to 200. Thus, an ungelled partial hydrolysis product of the invention typically will contain from 25 to 3.33 milliequivalents, and usually from 20 to 5.0 milliequivalents, of hydrolyzable Y groups per gram of ungelled partial hydrolysis product.

Examples of some preferred ungelled partial hydrolysis products of the invention, in terms of the approximate makeup of components contained therein, which would tend to be compatible with the constituents of a number of organic solvent-borne compositions include (a) an ungelled partial hydrolysis product containing from 10 to 90 percent by weight, preferably from 10 to 50 percent by weight, based on the total weight of the ungelled partial hydrolysis product, of a component substantially corresponding to the formula (VIII), i.e., R—Si(OR$^6$)$_3$ wherein R is as defined for formula (I) above, namely for R—Si—Y$_3$, and R$^6$ independently represents a C$_1$-C$_3$ alkyl group, preferably a C$_1$-C$_2$ alkyl group, and more preferably methyl, as well as from 10 to 90 percent by weight, preferably from 10 to 50 percent by weight, based on the total weight of the ungelled partial hydrolysis product, of a component substantially corresponding to the formula

wherein R is as defined for formula (I) above, and R$^6$ is as defined for formula (VIII) above; (b) an ungelled partial hydrolysis product containing from 10 to 80 percent by weight, preferably from 10 to 60 percent by weight, based on the total weight of the ungelled partial hydrolysis product, of a component substantially corresponding to the aforesaid formula (VIII), as well as from 10 to 80 percent by weight, preferably from 10 to 60 percent by weight, based on the total weight of the ungelled partial hydrolysis product, of a component substantially corresponding to the formula

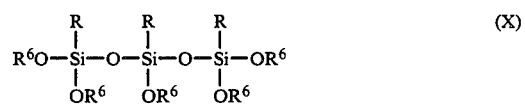

wherein R is as defined for formula (I) above, and R$^6$ is as defined for formula (VIII) above, as well as from 10 to 90 percent by weight, preferably from 30 to 80 percent by weight, based on the total weight of the ungelled partial hydrolysis product, of a component substantially corresponding to the formula

wherein R is as defined for formula (I) above, and R$^6$ is as defined for formula (VIII) above; and (c) an ungelled partial hydrolysis product containing from 10 to 80 percent by weight, preferably from 20 to 60 percent by weight, based on the total weight of the ungelled partial hydrolysis product, of a component substantially corresponding to the formula

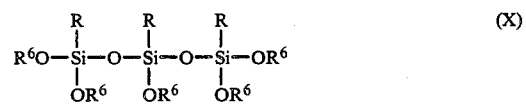

wherein R is as defined for formula (I) above, and R$^6$ is as defined for formula (VIII) above, as well as from 10 to 80 percent by weight. preferably from to 60 percent by weight, based on the total weight of the ungelled partial hydrolysis product, of a component substantially corresponding to the formula

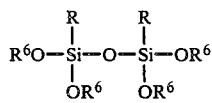

wherein R is as defined for formula (I) above, and R$^6$ is as defined for formula (VIII) above. A product corresponding to that described in part (c) above can be obtained as residue, for example, by removing from the ungelled partial hydrolysis product described in part (b) above the more volatile component R—Si(OR$^6$)$_3$ by distillation at a temperature of less than or equal to 160 degrees Celsius (C.) optionally under reduced pressure (i.e., a so-called "vacuum distillation"). Moreover, a product corresponding to that described in part (a) immediately above can be obtained, for example, as distillate by removing from the ungelled partial hydrolysis product described in part (b) above the more volatile components, R—Si(OR$^6$)$_3$ and that corresponding to formula (IX), by distillation at a temperature of less than or equal to 160 degrees Celsius (C.) optionally under reduced pressure. It should also be understood that ungelled partial hydrolysis products of the invention will also contain some materials of higher molecular weight than those represented by formula (X) above.

Products corresponding to that described in part (a) above are particularly desirable for reaction with organic polyols to form ungelled products which can be later employed for various purposes such as, for example, serving as curing agents for organic polyols or serving as the principal film forming resins in moisture-cure applications. They would be particularly desirable based on their functionality and volatility such that high levels of these product materials can be reacted essentially to completion with organic polyols without gelation and unreacted species can be removed conveniently where desired from the reaction product.

Products corresponding to that described in part (b) above are good generally either as curing agents for organic polyols or as reactive materials for organic polyols for preparation of ungelled resin compositions which can be later employed for various purposes. Moreover, such products as those described in part (b) are readily prepared in high yield and can be employed, where desired, without further processing.

Products corresponding to that described in part (c) above are particularly desirable as curing agents for organic polyols especially in heat curing applications where low volatility is an important consideration.

An ungelled partial hydrolysis product of the invention advantageously may be utilized, with or without the presence of a catalyst, as essentially a sole resin for coating or treatment of various substrates such as metal, paper, wood, wood furniture, hardboard, plastics, glass, and the like. However, when low temperature curing of an ungelled partial hydrolysis product of the invention is desired, typically a curing catalyst is employed in combination with the ungelled partial hydrolysis product. Typically, a coating of ungelled partial hydrolysis product of the invention on a substrate can be cured at 25 degrees C. within 24 hours in the presence of atmospheric moisture to a tack free state. By "tack free" is meant that the coating will not feel sticky to the touch when pressed with a finger. Examples of catalysts for curing an ungelled partial hydrolysis product of the invention include: acids such as paratoluenesulfonic acid; tin-containing compounds such as butylstannoic acid, dibutyl tin oxide, stannous octoate and dibutyl tin dilaurate; titanates such as tetraisopropyltitanate and tetrabutyltitanate; and amino compounds such as gamma-aminopropyltriethoxysilane, isopropanol amine, 2-amino-2-methyl-1-propanol, trimethylene diamine, isophorone diamine and the like.

Moreover, compositions containing ungelled partial hydrolysis products of the invention have a broad range of application and may be utilized, for example, as coating compositions, inks, sealants, etc. It has been found, for example, that acrylic polymers prepared by reacting ungelled partial hydrolysis products of the invention with acrylic polyols can provide coatings for wood furniture which exhibit an outstanding combination of properties compared to nitrocellulose lacquers which have long been utilized as topcoating compositions in the wood furniture industry. Moreover, it has been found that compositions based on acrylic polymers prepared from ungelled partial hydrolysis products of the invention can provide automotive quality coatings for both original equipment manufacture and automotive refinishing applications which can be cured at low temperatures (less than 180 degrees F., 82.2 degrees C.). Preferred compositions based on acrylic polymers of the invention for automotive refinishing applications can be cured at ambient temperature (e.g., 25 degrees C.) in the presence of atmospheric moisture.

A nonaqueous coating composition of the invention is essentially free of water. That is, when water is present in a nonaqueous coating composition of the invention, it is present in an insubstantial amount, typically in an amount of less than 1 percent by weight of water based on the total weight of the coating composition. Of course, it is to be understood that small residual amounts of water as contained, for example, in commercially available ingredients suitable for use in organic solvent-borne coating compositions are tolerable. Examples of solvents which may be utilized in nonaqueous coating compositions of the invention include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone and methylamyl ketone; esters such as butylacetate; hydrocarbons such as xylene and toluene; and mixtures thereof. As used herein, the term "solvents" includes not only true solvents, but also liquid diluents for the constituents of nonaqueous coating compositions of the invention.

Compositions utilizing ungelled partial hydrolysis products of the invention may be applied to substrates using any suitable technique such as brushing, dipping, spraying, roll coating, doctor blade coating, curtain coating, etc.

Compositions based on ungelled partial hydrolysis products of the invention may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, metallic flake pigments such as aluminum flakes and nickel flakes, etc. Mixtures of pigments also may be employed.

Additionally, ungelled partial hydrolysis products of the invention can be utilized as curing agents, in addition to or in substitution for generally known curing agents, for organic polyols generally known for use in coating compositions, examples of which polyols include but are not limited to simple diols, triols and higher hydric alcohols; acrylic polyols; polyurethane polyols; polyester polyols; polyether polyols; polyhydroxyl-functional epoxy resins; polyhydric polyvinyl alcohols; etc.

The ungelled partial hydrolysis products of the invention also may be utilized as additives to modify the properties of generally known compositions, for example coating compositions, compatible with additive amounts of the ungelled partial hydrolysis products.

For example, the ungelled partial hydrolysis products of the invention may be incorporated in additive amounts to modify various properties of compositions, for example coating compositions, such as rheological properties, examples of which include viscosity, surface tension, flow, leveling, etc. An "additive amount" with respect to utilization in a coating composition, for example, is understood herein to mean an amount of up to about 30 percent by weight based on the weight of resin solids in the coating composition (i.e., excluding pigments and solid fillers).

The following examples illustrate the invention and are not to be construed as limiting it to their details. As used herein, "pbw" means "parts by weight". All parts and percentages in the examples and throughout the specification are by weight unless specifically indicated otherwise.

EXAMPLE 1

Preparation Of An Ungelled Partially Hydrolyzed Organosilane

To a flask equipped with addition funnel, reflux condenser, thermometer, heater, stirrer and nitrogen inlet is charged at room temperature (about 24 degrees C.) under a blanket of nitrogen, 25,855 grams (g; 190.0 moles) of methyltrimethoxysilane (obtained as A-163 from Union Carbide Corp.) and 261.4 g (1.182 moles) of gamma-aminopropyltriethoxysilane (obtained as A-1100 from Union Carbide Corp.). Next, the contents of the flask are slowly heated over a period of 30 minutes to 50 degrees Celsius (degrees C.) at which point the slow addition of deionized water to the contents of the flask is begun. While the contents of the flask are stirred, a total of 1883.0 g (104.6 moles) of deionized water is added to the contents of the flask over a period of 75 minutes while the temperature of the contents of the flask (pot temperature) is maintained in the range of from 50 to 58 degrees C. Immediately after the addition of the water is completed, the contents of the flask are heated to reflux over a period of 17 minutes at the end of which period the pot temperature is 67 degrees C. The contents of the flask are allowed to reflux over a period of about 3 hours while the pot temperature is maintained in the range of from 64 to 68 degrees C. after which period heating is discontinued and the contents of the flask allowed to cool to ambient temperature. The resulting composition is an ungelled partially hydrolyzed organosilane.

EXAMPLE 2

Preparation Of An Ungelled Partial Hydrolysis Product Of A Mixture Of Organosilanes To a reaction vessel equipped with addition funnel, reflux condenser, thermometer, dropping funnel, heater, stirrer and nitrogen inlet is charged at room temperature 17,371 g (127.6 moles) of methyltrimethoxysilane, 11,581 g of QP8-5314 (a mixture of 25 mole percent methylphenyldimethoxysilane and 75 mole percent phenyltrimethoxysilane providing 14.9 moles of methylphenyldimethoxysilane and 44.7 moles of phenyltrimethoxysilane; available from Dow Corning Corp.) and 145 g of 2-amino-2-methylpropanol. The contents of the vessel are heated for 21 minutes to a temperature of 45 degrees C. whereupon heating is discontinued, and the pot temperature continues to rise over 14 minutes to 49 degrees C. at which temperature the addition of deionized water to the contents of the vessel is begun. While the contents of the reaction vessel are stirred, a total of 1,695 g (94.2 moles) of deionized water is added to the contents of the flask over a period of 1 hour and 26 minutes while the temperature of the contents of the reaction vessel ranges between 45 and 52 degrees C. Thereafter, the contents of the vessel are allowed to remain for 30 minutes in a temperature range of from 52 to 54 degrees C. at the end of which period the contents of the vessel are heated over a period of 25 minutes to a temperature of 66 degrees C. at which temperature refluxing is observed. Thereafter the contents of the vessel are refluxed for 4 hours and 32 minutes while the pot temperature is maintained in a range of from 59 to 65 degrees C. at the end of which period heating is discontinued and the contents of the vessel allowed to cool to ambient temperature. The resulting composition is an ungelled partially hydrolyzed mixture of organosilanes.

EXAMPLE 3

Preparation Of An Ungelled Partially Hydrolyzed Organosilane

To a flask equipped with addition funnel, reflux condenser, thermometer, heater, stirrer and nitrogen inlet is charged at room temperature under a blanket of nitrogen, 4,000 g of methyl trimethoxy silane and 20 g of 2-amino-2-methyl-1-propanol. Next, the contents of the flask are slowly heated over a period of 31 minutes to 50 degrees C. at which point the slow addition of deionized water to the contents of the flask is begun. While the contents of the flask are stirred, a total of 290.2 g of deionized water is added over a period of 85 minutes while the temperature of the contents of the flask (pot temperature) is maintained in the range of from 50 to 51 degrees C. Immediately after the addition of the water is completed, the contents of the flask are heated to reflux over a period of 54 minutes at the end of which period the pot temperature is 71 degrees C. The contents of the flask are allowed to reflux for 4 minutes after which heating and stirring are temporarily discontinued and the contents of the flask allowed to cool sufficiently to allow for the addition of boiling stones to the flask, a process which takes approximately 19 minutes. Thereafter, heating and stirring are resumed, and the contents of the flask brought to reflux within 6 minutes after which the contents are refluxed over a period of 3 hours and 2 minutes while the pot temperature is maintained at about 71 degrees C. Thereafter, heating is discontinued, and the contents of the flask are allowed to cool to ambient temperature. The resulting composition is an ungelled partially hydrolyzed organosilane.

EXAMPLE 4

Preparation Of An Ungelled Partially Hydrolyzed Mixture Of A Nonfunctional Organosilane And An Organosilicate To a flask equipped with addition funnel, reflux condenser, thermometer, heater, stirrer and nitrogen inlet is charged at room temperature under a blanket of nitrogen, 4,750 g of methyltrimethoxysilane, 4,750 g of tetraethyl orthosilicate and 50 g of 2-amino-2-methyl1-propanol thereby forming a hazy composition. Next, the contents of the flask are slowly heated over a period of 33 minutes to 50 degrees C. at which point the slow addition of deionized water to the flask is begun. While the contents of the flask are stirred, the slow addition of the deionized water is continued for 10 minutes after which period heating is discontinued while the remainder of the deionized water is slowly added to the flask over a period of 1 hour and 36 minutes during which period the temperature of the contents of the flask remains in a range of from 54 to 57 degrees C. At the point when addition of the water is complete, a total of 572.2 g of water has been added to the flask. Immediately after the addition of the water is completed, the contents of the flask are heated to reflux over a period of 1 hour and 24 minutes at the end of which period the pot temperature is 71 degrees C. The contents of the flask are allowed to reflux for 39 minutes at about 71 degrees C. after which period heating is discontinued, and the contents of the flask allowed to cool to ambient temperature. The resulting, hazy composition is an ungelled partially hydrolyzed mixture of nonfunctional organosilane and an organosilicate. The aforesaid hazy composition, when allowed to stand overnight at ambient temperature, settles out, thereby providing a clear composition.

What is claimed is:

1. An ungelled partial hydrolysis product of an organosilicon-containing material, said organosilicon-containing material comprising greater than or equal to 10 mole percent of at least one organosilane compound corresponding to the formula $R-Si-Y_3$ in which R represents hydrogen, or a $C_1-C_{10}$ group joined to Si through an Si—C linkage, and each Y independently represents an easily hydrolyzable group, wherein said partial hydrolysis product is prepared by hydrolyzing said easily hydrolyzable groups of said organosilane compound with water wherein the amount of water is determined according to the following formula $$(E_{1,2} \times 0.5) + (E_{3,4} \times Z) = W,$$

wherein

W represents the total moles H2O employed calculated on total equivalents of said easily hydrolyzable groups given that one equivalent of said easily hydrolyzable groups corresponds to 1 mole of said easily hydrolyzable groups employed, $E_{1,2}$ represents the total number of equivalents of Y employed from organosilane compounds containing one or two Y groups, $E_{3,4}$ represents the total number of equivalents of Y employed from organosilane compounds containing three or four Y groups, Z is a number in the range of from 0.023 to 0.43;

provided that said organosilicon-containing material has an average functionality of equal to or greater than 2.4 based on easily hydrolyzable Y groups attached to silicon atoms of organosilane compounds containing easily hydrolyzable Y groups present in said organosilicon-containing material but excluding easily hydrolyzable Y groups attached to silicon atoms of organosilane compounds having only 1 easily hydrolyzable Y group which may be present in said organosilicon-containing material.

2. The ungelled partial hydrolysis product of claim 1 wherein said organosilicon-containing material comprises a mixture of a nonfunctional organosilane and an amino-containing silane.

3. The ungelled partial hydrolysis product of claim 1 wherein each Y independently is selected from the group consisting of $-OR^1$,

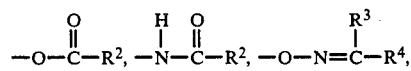

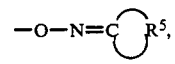

and the monohydroxy or cyclic $C_2-C_3$ residue of a 1,2- or 1,3-glycol, wherein $R^1$ represents $C_1-C_3$ alkyl, $R^2$ independently represents H or $C_1-C_4$ alkyl, $R^3$ and $R^4$ independently represent H, $C_1-C_4$ alkyl, or $C_6-C_8$ aryl and $R^5$ represents $C_4-C_7$ alkylene.

4. The ungelled partial hydrolysis product of claim 1 wherein each Y represents $-OR^1$ wherein $R^1$ is a $C_1-C_3$ alkyl group.

5. The ungelled partial hydrolysis product of claim 1 wherein each Y represents $-OR^1$ wherein $R^1$ is a $C_1-C_2$ alkyl group.

6. The ungelled partial hydrolysis product of claim 1 wherein each Y represents $-OR^1$ wherein $R^1$ is a methyl group.

7. The ungelled partial hydrolysis product of claim 1 wherein each Y independently is selected from the group consisting of methoxy, ethoxy and acetoxy.

8. The ungelled partial hydrolysis product of claim 1 wherein at least a portion of the R groups represent hydrogen or a $C_1-C_{10}$ group joined to Si through an Si—C linkage containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, and/or a halo atom.

9. The ungelled partial hydrolysis product of claim 1 wherein R represents an aliphatic group.

10. The ungelled partial hydrolysis product of claim 1 wherein R represents hydrogen or a $C_1-C_5$ group.

11. The ungelled partial hydrolysis product of claim 1 wherein R represents hydrogen or a $C_1-C_3$ group.

12. The ungelled partial hydrolysis product of claim 1 wherein said partial hydrolysis product contains an amount of said easily hydrolyzable Y groups such that the ratio of the number of grams of said partial hydrolysis product to equivalents of said easily hydrolyzable Y groups in said partial hydrolysis product is in a range of from 40 to 300.

13. The ungelled partial hydrolysis product of claim 1 wherein said organosilicon-containing material contains greater than or equal to 30 mole percent of said organosilane compound corresponding to the formula $R-Si-Y_3$.

14. The ungelled partial hydrolysis product of claim 1 wherein said partial hydrolysis product contains a ratio of residual Y groups to OH groups directly bonded to Si of greater than 1.00.

15. The ungelled partial hydrolysis product of claim 1 from which at least a portion of volatile components has been removed by distillation of said partial hydrolysis product at a temperature of less than or equal to 160 degrees Celsius.

16. The ungelled partial hydrolysis product of claim 1 from which at least a portion of volatile components has been removed by distillation of said partial hydrolysis product at a temperature of less than or equal to 160 degrees Celsius under reduced pressure.

17. The ungelled partial hydrolysis product of claim 1 additionally comprising a curing catalyst.

18. The ungelled partial hydrolysis product of claim 17 which cures at 25 degrees Celsius within 24 hours in the presence of moisture to a tack free state.

19. A nonaqueous coating composition comprising an ungelled partial hydrolysis product of an organosilicon-containing material, said organosilicon-containing material containing greater than or equal to 10 mole percent of at least one organosilane compound corresponding to the formula R—Si—Y$_3$ in which R represents hydrogen, or a $C_1$-$C_{10}$ group joined to Si through an Si—C linkage, and each Y independently represents an easily hydrolyzable group, wherein said partial hydrolysis product is prepared by hydrolyzing said easily hydrolyzable groups of said organosilane compound with water wherein the amount of water is determined according to the following formula $$(E_{1,2} \times 0.5) + (E_{3,4} \times Z) = W,$$

wherein

W represents the total moles H$_2$O employed calculated on the total equivalents of said easily hydrolyzable groups given that one equivalent of said easily hydrolyzable groups corresponds to 1 mole of said easily hydrolyzable groups employed, $E_{1,2}$ represents the total number of equivalents of Y employed from organosilane compounds containing one or two Y groups, $E_{3,4}$ represents the total number of equivalents of Y employed from organosilane compounds containing three or four Y groups, Z is a number in the range of from 0.023 to 0.43;

provided that said organosilicon-containing material has an average functionality of equal to or greater than 2.4 based on easily hydrolyzable Y groups attached to silicon atoms of organosilane compounds containing easily hydrolyzable Y groups present in said organosilicon-containing material but excluding easily hydrolyzable Y groups attached to silicon atoms of organosilane compounds having only 1 easily hydrolyzable Y group which may be present in said organosilicon-containing material.

20. The ungelled partial hydrolysis product of claim 1 comprising at least 10 percent by weight of a compound corresponding to the formula

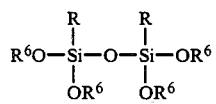

wherein

R independently represents a $C_1$-$C_{10}$ group joined to Si through an Si—C linkage, or hydrogen, and R$^6$ independently represents a $C_1$-$C_3$ alkyl group.

21. The ungelled partial hydrolysis product of claim 1 comprising (1) at least 10 percent by weight of a compound corresponding to the formula R—Si(OR$^6$)$_3$ wherein R independently represents a $C_1$-$C_{10}$ group joined to Si through an Si—C linkage, or hydrogen, and R$^6$ independently represents a $C_1$-$C_3$ alkyl group, and (2) at least 10 percent by weight of a compound corresponding to the formula

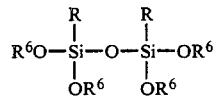

wherein

R independently represents a $C_1$-$C_{10}$ group joined to Si through an Si—C linkage, or hydrogen, and R$^6$ independently represents a $C_1$-$C_3$ alkyl group.

22. The ungelled partial hydrolysis product of claim 1 comprising (1) at least 10 percent by weight of a compound corresponding to the formula R—Si(OR$^6$)$_3$ wherein R independently represents a $C_1$-$C_{10}$ group joined to Si through an Si—C linkage, or hydrogen, and R$^6$ independently represents a $C_1$-$C_3$ alkyl group, and (2) at least 10 percent by weight of a compound corresponding to the formula

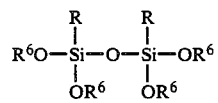

wherein

R independently represents a $C_1$-$C_{10}$ group joined to Si through an Si—C linkage, or hydrogen, and R$^6$ independently represents a $C_1$-$C_3$ alkyl group, (3) at least 10 percent by weight of a compound corresponding to the formula

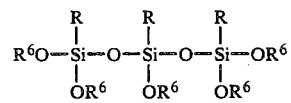

wherein

R independently represents a $C_1$-$C_{10}$ group joined to Si through an Si—C linkage, or hydrogen, and R$^6$ independently represents a $C_1$-$C_3$ alkyl group.

23. The ungelled partial hydrolysis product of claim 1 comprising (1) at least 10 percent by weight of a compound corresponding to the formula

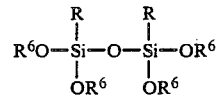

wherein

R independently represents a $C_1$-$C_{10}$ group joined to Si through an Si—C linkage, or hydrogen, and R$^6$ independently represents a $C_1$-$C_3$ alkyl group, (2) at least 10 percent by weight of a compound corresponding to the formula

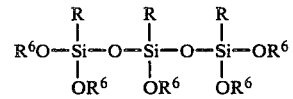

wherein

R independently represents a $C_1$-$C_{10}$ group joined to Si through an Si—C linkage, or hydrogen, and R$^6$ independently represents a $C_1$-$C_3$ alkyl group.

24. The nonaqueous coating composition of claim 19 further comprising an organic polyol wherein said ungelled partial hydrolysis product is a curing agent for said organic polyol.

25. The nonaqueous coating composition of claim 24 wherein said organic polyol is selected from the group consisting of simple diols, triols and higher hydric alcohols; acrylic polyols; polyester polyols; polyether polyols; polyurethane polyols; polyhydroxyl-functional epoxy resins; polyhydric polyvinyl alcohols; and mixtures thereof.

* * * * *